(12) United States Patent
Nakamura

(10) Patent No.: US 7,903,657 B2
(45) Date of Patent: Mar. 8, 2011

(54) METHOD FOR CLASSIFYING APPLICATIONS AND DETECTING NETWORK ABNORMALITY BY STATISTICAL INFORMATION OF PACKETS AND APPARATUS THEREFOR

(75) Inventor: Nobuyuki Nakamura, Osaka (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 345 days.

(21) Appl. No.: 12/010,607

(22) Filed: Jan. 28, 2008

(65) Prior Publication Data

US 2008/0186876 A1    Aug. 7, 2008

(30) Foreign Application Priority Data

Feb. 1, 2007    (JP) .................... 2007-023069

(51) Int. Cl.
*H04L 12/28*    (2006.01)
*H04L 12/56*    (2006.01)
*H04J 1/16*    (2006.01)
*G01R 31/08*    (2006.01)

(52) U.S. Cl. ...................... 370/392; 370/252

(58) Field of Classification Search ............. 370/254, 370/229, 235, 252, 392
See application file for complete search history.

(56) References Cited

U.S. PATENT DOCUMENTS

| | | | | |
|---|---|---|---|---|
| 6,757,738 B1 * | 6/2004 | Cao et al. | | 709/233 |
| 7,050,403 B2 * | 5/2006 | Mononen | | 370/252 |
| 7,290,283 B2 * | 10/2007 | Copeland, III | | 726/25 |
| 7,424,744 B1 * | 9/2008 | Wu et al. | | 726/23 |
| 7,752,307 B2 * | 7/2010 | Takara | | 709/224 |
| 2003/0226032 A1 * | 12/2003 | Robert | | 713/200 |
| 2005/0289237 A1 * | 12/2005 | Matsubara et al. | | 709/232 |
| 2007/0086337 A1 * | 4/2007 | Li et al. | | 370/229 |
| 2008/0298244 A1 * | 12/2008 | Corl et al. | | 370/235 |
| 2009/0147793 A1 * | 6/2009 | Hayakawa et al. | | 370/401 |

FOREIGN PATENT DOCUMENTS

JP    2006148686    6/2006
WO    WO 2006046577 A1 *    5/2006

OTHER PUBLICATIONS

Takayuki Shizuno et al; An Application Identification Method Based on Flow Behavior Analysis for an Aggregation of Flows; IEICE Technical Report NS2005-160, pp. 9-12, Mar. 2006. Discussed on Page 2 of specification.

* cited by examiner

*Primary Examiner* — Ayaz R Sheikh
*Assistant Examiner* — Hoang-Chuong Q Vu
(74) *Attorney, Agent, or Firm* — Rabin & Berdo, P.C.

(57) ABSTRACT

In a method for classifying the types of applications on an IP network, packets are received, and statistical information on at least TCP flags and TCP packet sizes of the received packets are gathered to store. On the basis of the statistical information on the stored TCP flags, the applications are classified into two types, while, on the basis of the statistical information on the stored TCP packet sizes, the applications are classified into two other types. Further on the basis of results of the classification; the applications are classified into four types.

22 Claims, 4 Drawing Sheets

|  | Broad Band Traffic | Narrow Band Traffic |
|---|---|---|
| P2P | TYPE A | TYPE B |
| C/S | TYPE C | TYPE D |

FIG. 3

| Time | 2007/xx/xx 00:00 |
|---|---|
| TCP size | 18475521 |
| TCP syn | 1606 |
| TCP syn ack | 641 |

FIG. 4

| Time | 2007/xx/xx 00:00 |
|---|---|
| TCP size | 18475521 |
| TCP count | 211825 |
| TCP syn | 1606 |
| TCP syn-ack | 641 |
| TCP rst | 136 |
| TCP fin | 1201 |
| TCP ack | 210191 |
| TCP psh | 32132 |
| TCP urg | 0 |
| TCP ecn | 0 |
| TCP cwr | 0 |
| TCP fin-urg-psh | 0 |
| TCP no flag | 0 |

|  | A | B | C | D |
|---|---|---|---|---|
| 2007/xx/xx00:00 | 5.2% | 15.1% | 26.4% | 53.3% |
| 2007/xx/xx00:01 | 4.6% | 21.0% | 25.5% | 48.9% |
| 2007/xx/xx00:02 | 1.8% | 18.4% | 16.0% | 63.8% |
| 2007/xx/xx00:03 | 2.4% | 12.9% | 32.0% | 52.7% |
| ... | ... | ... | ... | ... |

METHOD FOR CLASSIFYING APPLICATIONS AND DETECTING NETWORK ABNORMALITY BY STATISTICAL INFORMATION OF PACKETS AND APPARATUS THEREFOR

BACKGROUND OF THE INVENTION

1. Field of the Invention

The present invention relates to a method of and apparatus for classifying the types of applications being used on an IP (Internet Protocol) network to calculate a constitution ratio thereof. The present invention also relates to a method of and apparatus for detecting an abnormality in the network on the basis of results of the classification.

2. Description of the Background Art

Conventionally, as a technique for the purpose of cheaply providing probes whose reliability of network abnormality detection is high, Japanese patent laid-open publication No. 2006-148686 discloses an abnormality detector, which includes a traffic measurer measuring traffic routed to a network interface at the measurement intervals determined by an analysis-period determiner, a statistics calculator performing a statistical process at the measurement intervals on the header information analyzed by a packet analyzer, a feature information memory producing and storing at the measurement intervals feature information that contains as feature items the output data of the traffic measurer and statistics calculator, a database storing old feature information in order, and an abnormality detector which reads out, every time new feature information is produced, from the database feature information having its specific feature item equivalent to the new feature information with a certain range of identity, then statistically calculates a normal range for another feature item of the feature information readout, and compares the normal range with the corresponding other feature item of the new feature information, thereby detecting an abnormality.

T. Shizuno, et al., "An Application Identification Method based on Flow Behavior Analysis for an Aggregation of Flows" IEICE Technical Report No. NS2005-160, The Institute of Electronics, Information and Communication Engineers (March 2006), proposes another technique for identifying applications by referring to features for each communication flow.

As disclosed in the above-mentioned Japanese '686 patent publication, when the header information of Layer 4, equivalent to the transmission control protocol (TCP), or lower is used to detect a traffic abnormality, the port number of TCP or UDP (User Datagram Protocol) is being used. This is for the reason that different applications are respectively attached to port numbers. For instance, a hypertext transfer protocol (HTTP) is assigned to TCP port 80, so that it can be easily supposed that many Web applications will use that port number.

Recently, in order to avoid the packet filtering rule and for other reasons, a correct port number may not be utilized. Besides, reserved port numbers having no particular application are often used to utilize relatively new types of applications such as a point-to-point (P2P) application.

For those reasons, nowadays, systems that classify applications according to port numbers or utilize results of the classification are disadvantageous in that the classification results are not able to reflect actual traffic conditions sufficiently.

In addition, as disclosed in the above-mentioned T. Shizuno, et al., in the method of classifying applications for each flow, a vast amount of calculation is required when generally classifying the types of applications. This method also has the disadvantage that not all application types are classified.

In the method, even if an application could be correctly specified, the protocol may not be utilized, as in tunneling communication, for example, according to a predefined rule of utilization.

In such a case, even if an application could be specified, a practical way of utilization could not be specified in the last analysis. As a result, the method has the disadvantage that the significance of specifying applications has been lessened.

SUMMARY OF THE INVENTION

It is an object of the present invention to provide an application classifying method and apparatus capable of sufficiently reflecting actual network traffic conditions and classifying the types of applications being used on networks with a less amount of calculation. It is also an object of the invention to provide a network abnormality detecting method and apparatus which make use of such an application classifying method and apparatus.

In accordance with the present invention, there is provided a method of classifying the type of an application being used on an IP (Internet Protocol) network on the basis of a packet transmitted over the network to calculate an application constitution ratio. In the method, statistical information of the packet is stored in a storage. The method comprises: a reception step of receiving the packet; a data gathering step of storing in the storage statistical information on at least the TCP (Transmission Control Protocol) flag and TCP packet size of the packet received in the reception step; a first classification step of using a first mathematical equation on the basis of the statistical information on the TCP flag stored in the storage to classify the application into two types; a second classification step of using a second mathematical equation on the basis of the statistical information on the TCP packet size stored in the storage to classify the application into two other types; and a third classification step of classifying the application into four types in dependence upon a result of the first and second classification steps.

Thus, the application classifying method of the present invention is capable of sufficiently reflecting actual network traffic conditions and classifying the types of applications being used on networks with a less amount of calculation.

BRIEF DESCRIPTION OF THE DRAWINGS

The objects and features of the present invention will become more apparent from consideration of the following detailed description taken in conjunction with the accompanying drawings in which:

FIG. 3 shows a listing of TCP parameters (statistical information) gathered by a traffic gathering section in the embodiment;

FIG. 4 shows a listing of TCP parameters (statistical information) gathered by a traffic gathering section in an alternative embodiment;

DESCRIPTION OF THE PREFERRED EMBODIMENTS

Figures 1, 2:
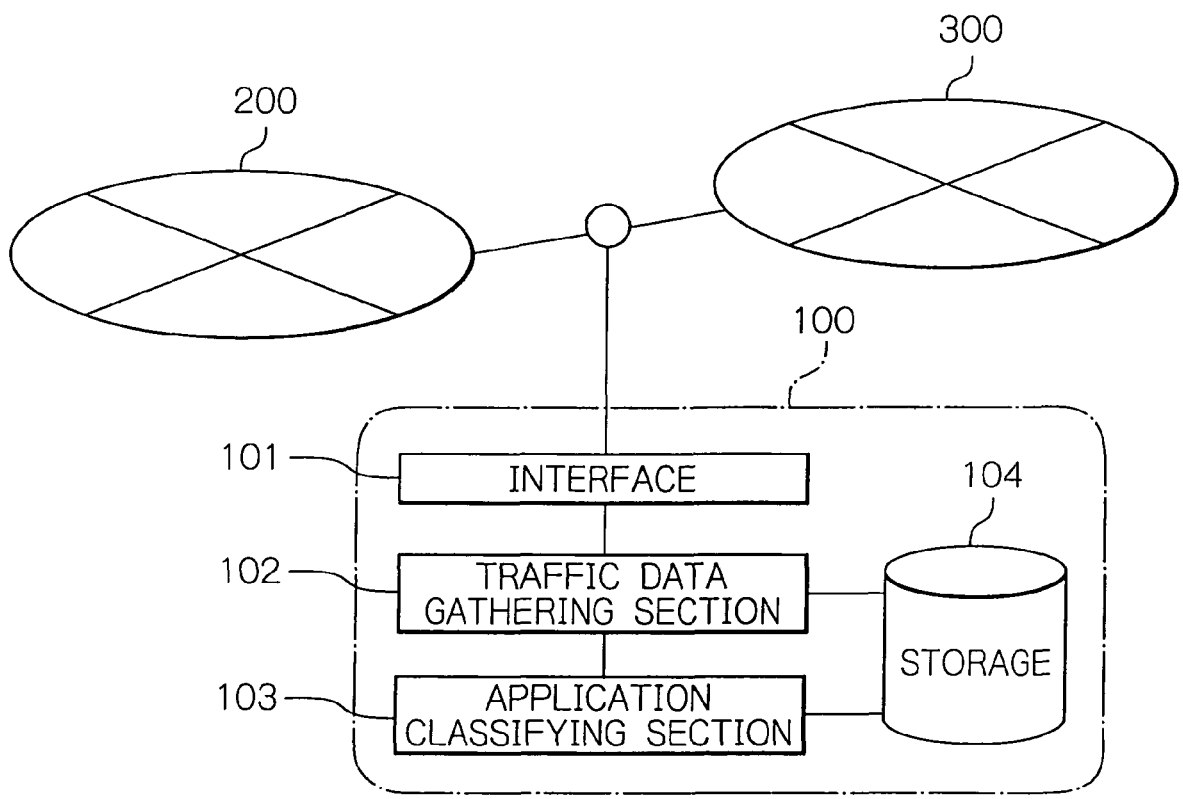
FIG. 1 is a schematic block diagram showing an embodiment of an application classifier according to the present invention.
FIG. 2 shows an example of applications classified in the embodiment of the present invention.

With reference to FIG. 1, a preferred embodiment of the present invention will now be described in detail. The preferred embodiment of an application classifier of the present invention shown in FIG. 1 in the form of schematic block diagram generally consists of an interface 101, a traffic data gathering section 102, an application classifying section 103, and a storage 104.

The interface 101 is adapted to receive an IP (Internet Protocol) packet transmitted over networks, and output it to the traffic data gathering section 102. The traffic data gathering section 102 is adapted to produce statistical information on at least the TCP (Transmission Control Protocol) flag and the TCP packet size of an IP packet received by the interface 101, and store that information in the storage 104. The details of the statistical information are to be described later. The application classifying section 103 is adapted to classify the types of applications being used on networks, on the basis of the statistical information stored in the storage 104. The classification process will be described in detail later. The storage 104 is adapted to store the above-described statistical information.

In FIG. 1, the application classifier 100 is connected to a first network 200 and a second network 300 through the interface 101. These networks are assumed to be IP networks.

The interface 101 may consist of a network interface circuit such as a local area network (LAN) interface or the like. The interface 101 also functions as a receiver in the instant embodiment.

The traffic data gathering section 102 and application classifying section 103 can be implemented in hardware or circuit devices for implementing these functions. Alternatively, they can be implemented in software programs that are runnable on an operating unit, such as a microcomputer and a central processing unit (CPU).

The storage 104 may be a rewritable storage such as a random access memory (RAM) and a hard-disk drive (HDD) storage.

As shown in FIG. 2, applications may be classified according to the present embodiment of the present invention. The method of classification is to be described later. Initially, a description will be given of the types of applications shown in FIG. 2. In the present embodiment, applications being used on networks are classified in two points of view: traffic and transmission type.

As to traffic, applications are classified into abroad band traffic type, or a broad band type, and a narrow band traffic type, or a narrow band type. This is a classification of applications according to data transfer rate. A motion picture distributing application, a file transfer application, and other similar applications correspond to the former, while applications for distributing control packets, text data and still image data correspond to the latter.

As to transmission type, applications are classified into a point-to-point (P2P) type and a client/server (C/S) type.

The above two classifications enable applications to be sorted into four types of 2×2 matrix.

For example, a P2P file exchanging application, a P2P voice application and a multimedia content distributing application respectively correspond to types A, B and C in FIG. 2. A variety of applications, such as signaling protocols and conventional text-based applications, correspond to type D in FIG. 2.

The application classifying section 103 is adapted to classify an application being used on networks into either one of the above-described four types. The method of classification is to be described later.

With now reference to FIG. 3, shown is a listing of TCP parameters of statistical information gathered by the traffic gathering section 102.

The traffic gathering section 102 is adapted to analyze the header of a packet received from the interface 101 to gather TCP parameters, and store the statistical information in the storage 104. The time for gathering parameters, i.e. sampling time, may be determined in advance.

The storage 104 stores statistical information, such as the total size of TCP packets, total number of TCP packets, total number of packets having a TCP syn flag and total number of packets having both a TCP syn flag and a TCP ack flag.

Now, the operation of the application classifying section 103 of the present embodiment will be described in detail. In operation, the application classifying section 103 reads out the above-described statistical information stored in the storage 104 to perform the following processing.

In the present embodiment, the total number of packets having both TCP syn and ack flags is taken to be the total number of sessions (referred to as SA) established during the sampling time.

The numerical value of the division of the total number of packets having both TCP syn and ack flags (SA) by the total number of packets having a TCP syn flag (S) is calculated and is taken to be a session establishment ratio during the sampling time, i.e. a stable degree of connection.

If the ratio of the number of P2P applications to the number of all applications is represented by P and the ratio of the number of C/S applications to the number of all applications is represented by C, the following expression (1) is obtained:

$$P+C=1 \quad (1)$$

A session establishment ratio in the P2P application is defined as 0.8, and a session establishment ratio in the C/S application is defined as 0.2. This gives the following expression (2):

$$SA/S=0.8P+0.2C \quad (2)$$

The values of P and C can be calculated from the expressions (1) and (2).

When the value of SA/S is greater than 0.8, P and C are set to 1.0 and 0.0, respectively. When the value of SA/S is less than 0.2, P and C are set to 0.0 and 1.0, respectively. It should be noted here that these coefficients 0.8 and 0.2 have been predefined according to a simulation result, and therefore the present invention is not to be interpreted as being limited to these values.

Thus, the above processing renders it possible to classify applications into two types: P2P type and C/S type. Next, a procedure for classifying into broad band and narrow band types will be described in detail.

If the ratio of the number of broad band type applications to the number of all applications is represented by BB, and the ratio of the number of narrow band type applications to the number of all applications is represented by NB, then the numbers BB and NB are related to each other, as defined by the following expression (3):

$$BB+NB=1.0 \quad (3)$$

Suppose, for example, an average data transmission rate for a broad band type application is 300 kbit/s (kbps), and an average data transmission rate for a narrow band type application is 3 kbps. Taking a relationship with the total size of TCP packets (TS) into account, the following expression (4) is obtained:

$$SA \times BB \times 300 \text{(kbps)} + SA \times NB \times 3 \text{(kbps)} = TS \times 8/\text{sampling period} \quad (4)$$

Note that in the right-hand side of the expression (4), TS is multiplied by "8" to convert the unit from bytes to bits, and then TS×8 is divided by the sampling period to cause the unit to match with a data transmission rate (kbps).

It is also noted that these data transmission rates 300 kbps and 3 kbps have been selected in view of the current Internet traffic, so that the present invention does not necessarily have to be limited to these values. Therefore, they may be changed in dependence upon an object to be detected.

The values of BB and NB can be calculated from the expressions (3) and (4).

When an average TCP data transmission rate in the network is higher than 300 kbps, BB and NB are set to 1.0 and 0.0, respectively.

Thus, the above processing makes it possible to sort application types into a couple of types: broad band type and narrow band type.

Depending upon the classification results described above, the application classifying section 103 is able to classify applications being used on the network into four types, types A through D shown in FIG. 2. The ratio of each type can be calculated as the following expressions:

The ratio of type $A = P \times BB$

The ratio of type $B = P \times NB$

The ratio of type $C = C \times BB$

The ratio of type $D = 1.0 - (A+B+C)$

As set forth above, the present embodiment is capable of classifying applications being used on the network into four types without performing a process requiring a large quantity of calculation such as the protocol analysis of layer 5 or higher.

Therefore, in the embodiment, because it is possible to easily grasp what type of application is being used on the network, it is advantageous to be easy of general grasp of network conditions.

In the above embodiment, in the above-described expressions (2) and (4), application constitution ratios are calculated on the basis of the TCP flags and TCP sizes gathered by using predetermined coefficients. However, in an alternative embodiment of the present invention, the application classifying section 103 has a mechanical learning function which learns correct data by giving supervised data in advance so that to enable the applications with more complex packet constitution to be classified. The alternative embodiment will be described in detail as following.

In the alternative embodiment, typical applications or protocol packets, which respectively correspond to the applications of the four types shown in FIG. 2, are falsely produced to make traffic data, and the application classifying section 103 is allowed to learn the traffic data in advance.

For instance, the four types are type A as a P2P file exchanging application, type B as a P2P voice application, type C as FTP-data, and type D as http. Then, pseudo traffic is caused to occur so that statistical information such as a TCP flag and a TCP packet size can be gathered.

In the alternative embodiment, as shown on a list of TCP parameters in FIG. 4, the traffic gathering section 102 gathers statistical information to produce the TCP parameters.

As shown in FIG. 4, according to the alternative embodiment, many parameters can be gathered to produce statistical information as compared with the TCP parameters described in the above embodiment. Owing to an increase in number of parameters, the application constitution ratios cannot be calculated by simplified equations such as the expressions (1) to (4) described in respect of the above embodiment. Instead of this, the alternative embodiment is aimed at classifying applications by the learning results of a mechanical learning section.

Figure 5:
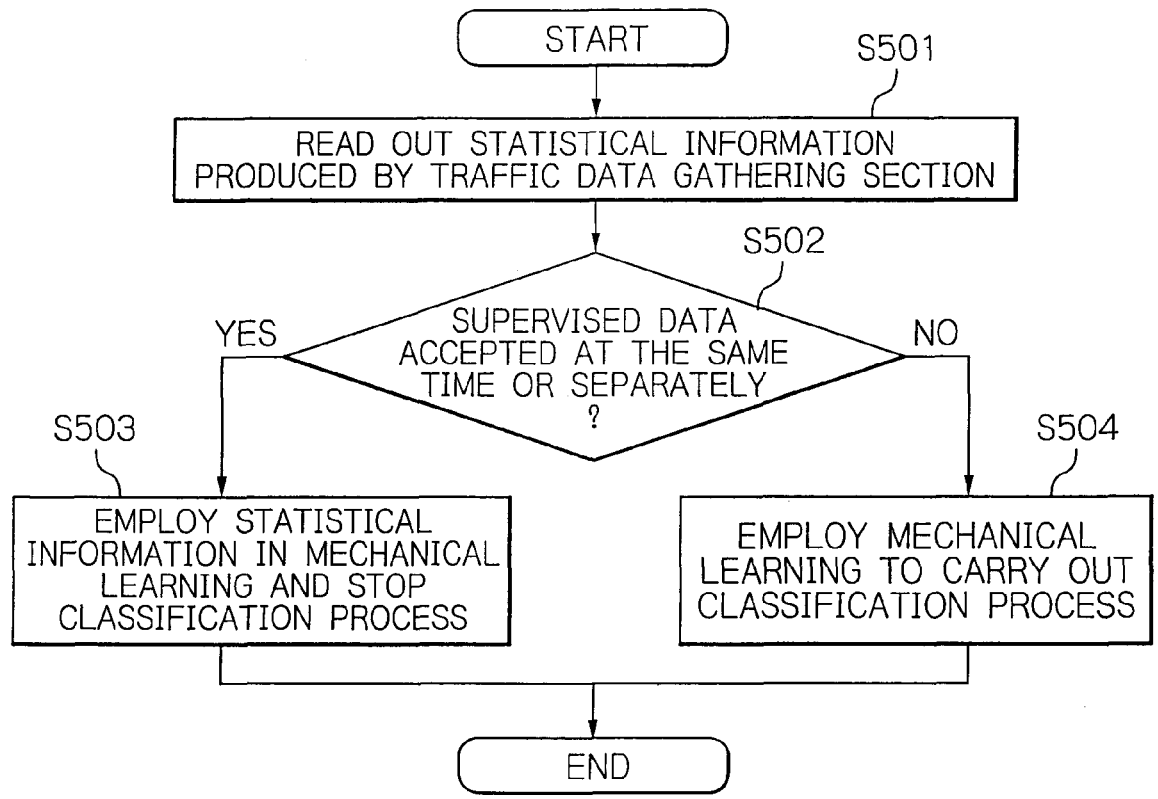
FIG. 5 is a flow chart showing how to classify applications by an application classifying section in the alternative embodiment.

Now, the operation of the application classifying section 103 of the alternative embodiment will be described in detail with reference to a flow chart of FIG. 5.

In step S501, the application classifying section 103 reads out the statistical information produced by the traffic data gathering section 102 from the storage 104.

In step S502, when the application classifying section 103 receives supervised data at the same time as step S501 or with separately input, the application classifying section 103 goes to step S503, and except that case, it goes to step S504. Note that the supervised data used in the alternative embodiment refers to the application constitution ratios (A through D types) at the time of producing pseudo traffic. When pseudo traffic is produced, the application constitution ratio of each type is known, so the numerical values of the ratio may be given as the supervised data.

In step S503, the application classifying section 103 performs mechanical learning by using the read statistical information and supervised data, and stores the learning results in the storage 104. The mechanical learning determines threshold values such as coefficients of mathematical equations for carrying out a classification of applications.

In step S504, the application classifying section 103 calculates the constitution ratios of applications being used on networks on the basis of the read statistical information by using the learning result data stored in the storage 104.

In the alternative embodiment, while it has been described that applications are classified into the four types, the classification by the present invention is not to be interpreted as being limited to four types. Particularly, in the alternative embodiment, because the application classifying section 103 has the mechanical learning function, even in the case of a complicated classification, it is possible to learn supervised data if the data are suitable.

As set forth above, the alternative embodiment classifies applications by utilizing many TCP flags, unlike the above embodiment. Therefore, with regard to protocols which are difficult for network managers or administrators to grasp what type of application is being employed, such as an encryption protocol, a special protocol such as a personal protocol, and a tunneling protocol, it is possible to calculate four types of traffic.

Figure 6:
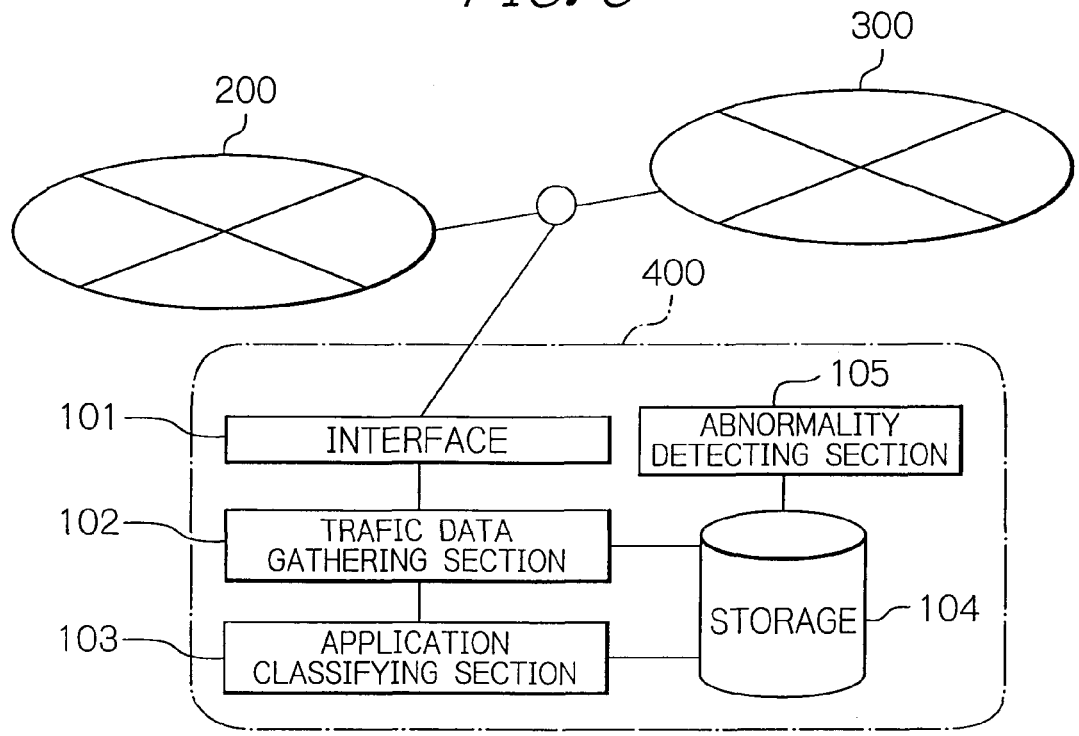
FIG. 6 is a schematic diagram showing a network abnormality detector according to another alternative embodiment of the present invention.

With now reference to FIG. 6, a network abnormality detector 400 according to another alternative embodiment of the present invention further includes an abnormality detecting section 105 in addition to the interface 104, traffic data gathering section 102, application classifying section 103, and storage 104 described in the above two embodiments. The storage 104 stores classified data that are to be described in FIG. 7 described later.

Figures 7, 8:
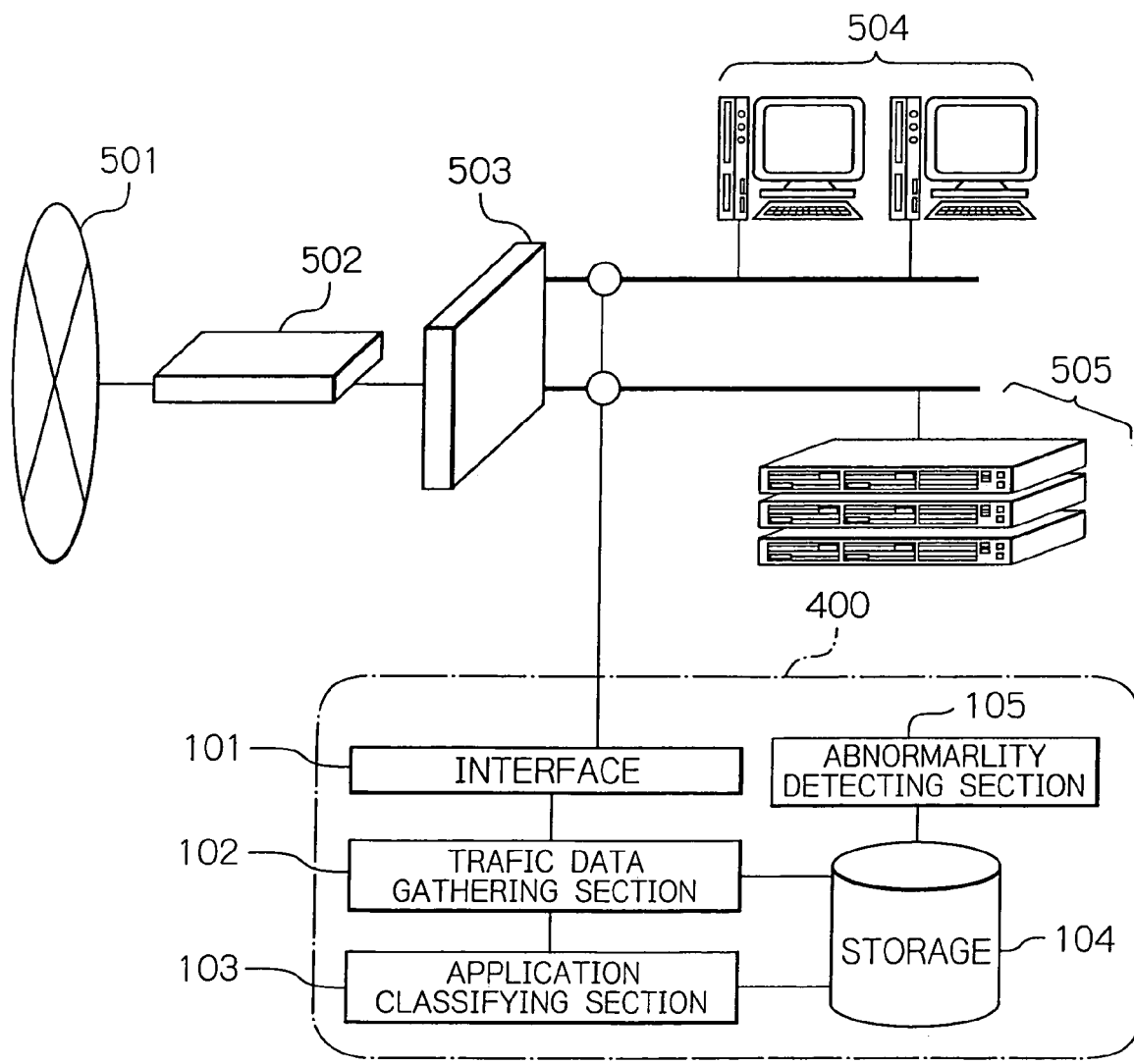
FIG. 7 shows an example of data types and classification data that are stored in a storage.
FIG. 8 is a schematic diagram showing a network system according to still another alternative embodiment of the present invention.

The abnormality detecting section 105 is adapted to decide, as classified data for abnormality detection, one of the classified data stored in the storage 104 as shown in FIG. 7 described later, and compare the decided data with other classified data to determine whether or not the decided data has an abnormality. The details will be described later.

In FIG. 6, while the application classifier 100 described in connection with the above two embodiments is formed integrally with the network abnormality detector 400, they may be separately formed as a separate system.

The abnormality detecting section 105 can be implemented in hardware or circuit devices for implementing the function. Alternatively, it can be implemented in software programs that are runnable on an operating unit, such as a microcomputer and a central processing unit.

The storage 104 of the illustrative embodiment stores data constitution ratios and data types as shown in FIG. 7.

The application classifying section 103 is adapted to store classification results in the storage 104 in a time series. In FIG. 7, classification results are stored at intervals of one minute with the instant alternative embodiment.

For instance, in the first row, a classification result is stored on the basis of data such as TCP flags gathered during one minute from the date and time "2007/xx/xx/00:00".

Now, operation of the abnormality detecting section 105 will be described in detail. The abnormality detecting section 105 carries out an abnormality detection process as the following steps according to a given trigger such as store of new classified data into the storage 104 and reception of an instruction command from outside the abnormality detector.

First, in step (1), the abnormality detecting section 105 decides one of a plurality of classified data as classified data for abnormality detection. For example, in the case of performing abnormality detection when new classified data is stored into the storage 104, the abnormality detecting section 105 performs the following analysis with the new classified data as classified data for abnormality detection. In the case of performing abnormality detection when an instruction command is accepted, the abnormality detecting section 105 performs the following analysis with classified data during a specified period of time as classified data for abnormality detection.

Next, in step (2), the abnormality detecting section 105 decides classified data that is to be compared with the classified data for abnormality detection decided in step (1). The classified data for comparison employs classified data stored earlier than the classified data for abnormality detection.

With reference to FIG. 7, when the classified data in the fourth row is used as data for abnormality detection, any one of the classified data in the first, second, and third rows is compared with the classified data in the fourth row. The range of classified data for comparison may be the past five sets of classified data, or all of classified data within the past 24 hours.

Then, going to step (3), the abnormality detecting section 105 reads out the classified data for abnormality detection decided in step (1) and classified data for comparison decided in step (2) from the storage 104.

In further step (4), the abnormality detecting section 105 compares the classified data for abnormality detection decided in step (1) with the classified data for comparison decided in step (2) to calculate a deviation therebetween. If the deviation is higher than or equal to a predetermined threshold value, it is possible to determine that the classified data for abnormality detection has an abnormality.

The degree of deviation may be obtained by calculating the mean value or dispersed value of classified data for comparison in dependence upon classified ratio, calculating a deviation value by which the classified data for abnormal detection differs from the mean value or dispersed value, and adding the two values together. That is, when the classified data for abnormality detection is acquired, it is possible to find that an abnormal packet has occurred for some reason in the network.

In addition to calculation of the deviation degree, the classified data for comparison may be learned by using a stream mining technique such as a discounting learning machine to determined an abnormality in classified data for abnormal detection on the basis of the learning results.

As set forth above, according to the instant alternative embodiment, application constitution ratios are calculated by the method described in the aforementioned two embodiments, and a network traffic abnormality is detected by detecting a variation in the application constitution ratio. Therefore, it is advantageous that the abnormality can be quickly detected.

As the alternative embodiment can instantaneously determine which traffic of the application classifications of types A through D is abnormal, it is further advantageous that traffic conditions and countermeasures can be easily estimated.

With now reference to FIG. 8, in a network system in accordance with still another alternative embodiment of the present invention, the Internet 501 is connected with a router 502. The router 502 is interposed between its downstream network and the Internet 501 so as to connect them together, and provides a packet routing function.

In FIG. 8, a firewall 503 has a function of filtering the incoming packets from the router 502 according to a predefined packet filtering rule. The outgoing packets from the firewall 503 reach the downstream network. Reference numeral 504 denotes a client terminal such as a personal computer, which is connected to a server 505. The server 505 functions as comprehensive works of the system, e.g. to send information or services requested by the client terminal 504.

In the instant alternative embodiment, the network abnormality detector 400 described in the above embodiment is connected to the output of the firewall 503 to gather the incoming packets therefrom, and performs the aforementioned application classification process and abnormality detection process on the basis of the gathered packets.

In FIG. 8, the network abnormality detector 400 functions as a sort of Intrusion Detection System (IDS). More specifically, as the network abnormality detector 400 monitors the incoming packets from the firewall 503, for example, when the abnormal traffic is caused by packets which falsely penetrated the firewall 503 with a camouflaged port number, the detector 400 can detect the abnormal traffic thus caused to prevent the damage of a network attack from being incurred beforehand.

In addition, when an abnormality is detected by the abnormality detecting section 105, it is possible to quickly cope with the detected abnormality by sending out a warning to a system manager, administrator or other person with any one of the following ways.

In a first way, the abnormality detecting section 105 sends out an abnormality occurrence notification to the system manager by email or the like.

In another way, an alarm unit for issuing an audible or visible alarm or other signal is connected with the abnormality detecting section 105, and at the time of the occurrence of an abnormality, that abnormality is informed by physical means such as voice or light.

In still another way, the abnormality detecting section 105 issues a Simple Network Management Protocol (SNTP) trap to notify another monitoring system of the occurrence of an abnormality.

The entire disclosure of Japanese patent application No. 2007-23069 filed on Feb. 1, 2007, including the specification, claims, accompanying drawings and abstract of the disclosure, is incorporated herein by reference in its entirety.

While the present invention has been described with reference to the particular illustrative embodiments, it is not to be restricted by the embodiments. It is to be appreciated that those skilled in the art can change or modify the embodiments without departing from the scope and spirit of the present invention.

What is claimed is:

1. A method of classifying a type of an application being used on an IP (Internet Protocol) network based on a packet transmitted over the network to calculate an application constitution ratio, comprising:
   a step of providing a storage for storing statistical information of the packet;
   a reception step of receiving the packet;
   a data gathering step of storing in the storage statistical information on at least a TCP (Transmission Control Protocol) flag and a TCP packet size of the packet received in said reception step;
   a first classification step of using a first mathematical equation on the basis of the statistical information on the TCP flag stored in the storage to classify the application into two types;
   a second classification step of using a second mathematical equation on the basis of the statistical information on the TCP packet size stored in the storage to classify the application into two other types; and
   a third classification step of classifying the application into four types in dependence upon a result of said first and second classification steps,
   wherein said data gathering step stores a first total number of packets having a syn flag and a second total number of packets having both a syn flag and an ack flag as the storage statistical information, and
   wherein said first classification step:
      classifies the application in view of first and second transmission types,
      determines a stable degree of connection of sessions during a predetermined sampling time on the basis of said first and second total numbers in the predetermined sampling time,
      determines first and second establishment ratios for establishing the sessions by the applications of said first and second transmission types in advance, respectively, and
      classifies the application into said first or second transmission type according to said stable degree and said first and second establishment ratios.

2. The method in accordance with claim 1, wherein said first classification step:
   uses said first establishment ratio determined from 0 to 1, inclusive, and said second establishment ratio is obtained by subtracting said first establishment ratio from 1,
   determines said stable degree by dividing said second total number by said first total number, and
   classifies the application, in a case of said stable degree being larger than said first establishment ratio, into said first transmission type or, in another case of said stable degree being smaller than said second establishment ratio, into said second transmission type.

3. The method in accordance with claim 1, wherein said first total number is S, said second total number is SA, and said first establishment ratio is E, and wherein said first classification step:
   uses S, SA, and E as factors of said first mathematical equation,
   carries out, when ratios of the numbers of the first and second transmission type applications to the number of all applications are respectively represented by P and C, where P+C=1, said first mathematical equation of $$SA/S = E \times P + (1-E) \times C$$

to obtain said ratios P and C, and classifies the application into said first or second transmission type by using said ratios P and C.

4. The method in accordance with claim 3, wherein said second establishment ratio is (1-E), and wherein E and (1-E) are respectively 0.8 and 0.2 in said first classification step.

5. The method in accordance with claim 1, wherein the two types in said first classification step comprise a point-to-point type as said first transmission type and a client/server type as said second transmission type.

6. A method of classifying a type of an application being used on an IP (Internet Protocol) network based on a packet transmitted over the network to calculate an application constitution ratio, comprising:
   a step of providing a storage for storing statistical information of the packet;
   a reception step of receiving the packet,
   a data gathering step of storing in the storage statistical information on at least a TCP (Transmission Control Protocol) flag and a TCP packet size of the packet received in said reception step;
   a first classification step of using a first mathematical equation on the basis of the statistical information on the TCP flag stored in the storage to classify the application into two types;
   a second classification step of using a second mathematical equation on the basis of the statistical information on the TCP packet size stored in the storage to classify the application into two other types; and
   a third classification step of classifying the application into four types in dependence upon a result of said first and second classification steps,
   wherein said data gathering step stores a total size of TCP packets and total number of packets having both a syn flag and an ack flag as the storage statistical information, and
   wherein said second classification step:
      classifies the application in view of first and second traffic types,
      determines an averaged data transmission rate during a predetermined sampling time on the basis of said total size of TCP packets in the predetermined sampling time,
      determines first and second data transmission rates of the first and second traffic type applications in advance, respectively, and
      classifies the application into said first or second traffic type according to said averaged data transmission rate, said total number and said first and second data transmission rates.

7. The method in accordance with claim 6, wherein said second classification step:
  determines said averaged data transmission rate by multiplying said total size in predetermined sampling time by 8 to change its unit to a bit and then dividing the multiplied result by the predetermined sampling time, and
  classifies the application, in a case of said averaged data transmission rate being larger than said first data transmission rate, into said first traffic type.

8. The method in accordance with claim 6, wherein said total number is SA, said total size is TS, the predetermined sampling time is SP, said first data transmission rate is T1, and said second data transmission rate is T2, and wherein said second classification step:
  uses SA, TS, SP, T1, and T2 as factors of said second mathematical equation,
  carries out, when ratios of the numbers of the first and second traffic type applications to the number of all applications are respectively represented by BB and NB, where BB+NB=1, said second mathematical equation of $$SA \times BB \times T1 + SA \times NB \times T2 = TS \times 8/SP$$

to obtain said ratios BB and NB, and classifies the application into said first or second traffic type by using said ratios BB and NB.

9. The method in accordance with claim 8, wherein said first and second data transmission rates T1 and T2 are respectively 300 kbps and 3 kbps in said second classification step.

10. The method in accordance with claim 6, wherein the two other types in said second classification step comprise a broad band type as said first traffic type and a narrow band type as said second traffic type.

11. The apparatus in accordance with claim 6, wherein the two types in said first classifier comprise a point-to-point type as said first transmission type and a client/server type as said second transmission type.

12. A program embedded in a non-transitory computer-readable medium for causing a computer to carry out a method of classifying a type of an application being used on an IP (Internet Protocol) network based on a packet transmitted over the network to calculate an application constitution ratio, said method comprising:
  a step of providing a storage for storing statistical information of the packet; a reception step of receiving the packet;
  a data gathering step of storing in the storage statistical information on at least a TCP (Transmission Control Protocol) flag and a TCP packet size of the packet received in said reception step;
  a first classification step of using a first predetermined mathematical equation on the basis of the statistical information on the TCP flag stored in the storage to classify the application into two types;
  a second classification step of using a second predetermined mathematical equation on the basis of the statistical information on the TCP packet size stored in the storage to classify the application into two other types; and
  a third classification step of classifying the application into four types in dependence upon a result of said first and second classification steps,
  wherein said data gathering step stores a first total number of packets having a syn flag and a second total number of packets having both a syn flag and an ack flag as the storage statistical information, and
  wherein said first classification step:
    classifies the application in view of first and second transmission types,
    determines a stable degree of connection of sessions during predetermined sampling time on the basis of said first and second total numbers in the predetermined sampling time,
    determines first and second establishment ratios for establishing the sessions by the applications of said first and second transmission types in advance, respectively, and
    classifies the application into said first or second transmission type according to said stable degree and said first and second establishment ratios.

13. A program embedded in a non-transitory computer-readable medium for causing a computer to carry out a method of classifying a type of an application being used on an IP (Internet Protocol) network based on a packet transmitted over the network to calculate an application constitution ratio, said method comprising:
  a step of providing a storage for storing statistical information of the packet; a reception step of receiving the packet;
  a data gathering step of storing in the storage statistical information on at least a TCP (Transmission Control Protocol) flag and a TCP packet size of the packet received in said reception step;
  a first classification step of using a first predetermined mathematical equation on the basis of the statistical information on the TCP flag stored in the storage to classify the application into two types;
  a second classification step of using a second predetermined mathematical equation on the basis of the statistical information on the TCP packet size stored in the storage to classify the application into two other types; and
  a third classification step of classifying the application into four types in dependence upon a result of said first and second classification steps,
  wherein said data gathering step stores a total size of TCP packets and total number of packets having both a syn flag and an ack flag as the storage statistical information, and
  wherein said second classification step:
    classifies the application in view of first and second traffic types,
    determines an averaged data transmission rate during predetermined sampling time on the basis of said total size of TCP packets in the predetermined sampling time,
    determines first and second data transmission rates of the first and second traffic type applications in advance, respectively, and
    classifies the application into said first or second traffic type according to said averaged data transmission rate, second total number and said first and second data transmission rates.

14. Application classifier apparatus for classifying a type of an application being used on an IP (Internet Protocol) network based on a packet transmitted over the network to calculate an application constitution ratio, comprising:
  a storage for storing statistical information of the packet;
  a receiver for receiving the packet;
  a data gathering section for storing in said storage statistical information on at least a TCP (Transmission Control Protocol) flag and a TCP packet size of the packet received by said receiver;

a first classifier for using a first mathematical equation on the basis of the statistical information on the TCP flag stored in said storage to classify the application into two type;

a second classifier for using a second mathematical equation on the basis of the statistical information on the TCP packet size stored in said storage to classify the application into two other types; and a third classifier for classifying the application into four types in dependence upon a result from processing by said first and second classifiers, wherein said storage stores a first total number of packets having a syn flag and a second total number of packets having both a syn flag and an ack flag as the storage statistical information, and wherein said first classifier:
- classifies the application in view of first and second transmission types,
- determines a stable degree of connection of sessions during predetermined sampling time on the basis of said first and second total numbers in the predetermined sampling time,
- determines first and second establishment ratios for establishing the sessions by the applications of said first and second transmission types in advance, respectively, and
- classifies the application into said first or second transmission type according to said stable degree and said first and second establishment ratios.

15. The apparatus in accordance with claim 14, wherein said first classifier:
- uses said first establishment ratio determined from 0 to 1, inclusive, and said second establishment ratio obtained by subtracting said first establishment ratio from 1,
- determines said stable degree by dividing said second total number by said first total number, and
- classifies the application, in a case of said stable degree being larger than said first establishment ratio, into said first transmission type or, in another case of said stable degree being smaller than said second establishment ratio, into said second transmission type.

16. The apparatus in accordance with claim 14, wherein said first total number is S, said second total number is SA, and said first establishment ratio is E, and wherein said first classifier:
- uses S, SA, and E as factors of said first mathematical equation,
- carries out, when ratios of the numbers of the first and second transmission type applications to the number of all applications are respectively represented by P and C, where P+C=1, said first mathematical equation of $$SA/S = E \times P + (1-E) \times C$$

to obtain said ratios P and C, and
- classifies the application into said first or second transmission type by using said ratios P and C.

17. The apparatus in accordance with claim 16, wherein said second establishment ratio is (I-E), and wherein E and (I-E) are respectively 0.8 and 0.2 in said first classifier.

18. Application classifier apparatus for classifying a type of an application being used on an IP (Internet Protocol) network based on a packet transmitted over the network to calculate an application constitution ratio, comprising:
- a storage for storing statistical information of the packet;
- a receiver for receiving the packet;
- a data gathering section for storing in said storage statistical information on at least a TCP (Transmission Control Protocol) flag and a TCP packet size of the packet received by said receiver;
- a first classifier for using a first mathematical equation on the basis of the statistical information on the TCP flag stored in said storage to classify the application into two type;
- a second classifier for using a second mathematical equation on the basis of the statistical information on the TCP packet size stored in said storage to classify the application into two other types; and
- a third classifier for classifying the application into four types in dependence upon a result from processing by said first and second classifiers, wherein said storage stores a total size of TCP packets and total number of packets having both a syn flag and an ack flag as the storage statistical information, and wherein said second classifier:
- classifies the application in view of first and second traffic types,
- determines an averaged data transmission rate during predetermined sampling time on the basis of said total size of TCP packets in a predetermined sampling time,
- determines first and second data transmission rates of the first and second traffic type applications in advance, respectively, and
- classifies the application into said first or second traffic type according to said averaged data transmission rate, second total number and said first and second data transmission rates.

19. The apparatus in accordance with claim 18, wherein said second classifier:
- determines said averaged data transmission rate by multiplying said total size in predetermined sampling time by 8 to change its unit to a bit and then dividing the multiplied result by the predetermined sampling time, and
- classifies the application, in a case of said averaged data transmission rate being larger than said first data transmission rate, into said first traffic type.

20. The apparatus in accordance with claim 18, wherein said total number is SA, said total size is TS, the predetermined sampling time is SP, said first data transmission rate is T1, and said second data transmission rate is T2, and wherein said second classifier:
- uses SA, TS, SP, T1, and T2 as factors of said second mathematical equation,
- carries out, when ratios of the numbers of the first and second traffic type applications to the number of all applications are respectively represented by BB and NB, where BB+NB=1, said second mathematical equation of $$SA \times BB \times T1 + SA \times NB \times T2 = TS \times 8/SP$$

to obtain said ratios BB and NB, and
- classifies the application into said first or second traffic type by using said ratios BB and NB.

21. The apparatus in accordance with claim 20, wherein said first and second data transmission rates T1 and T2 are respectively 300 kbps and 3 kbps in said second classifier.

22. The apparatus in accordance with claim 18, wherein the two other types in said second classifier comprise a broad band type as said first transmission type and a narrow band type as said second transmission type.

* * * * *